(12) United States Patent
Yoo et al.

(10) Patent No.: US 8,368,759 B2
(45) Date of Patent: Feb. 5, 2013

(54) LANDMARK FOR POSITION DETERMINATION OF MOBILE ROBOT AND APPARATUS AND METHOD USING IT

(75) Inventors: Ki-Sung Yoo, Pohang (KR); Chin-Tae Choi, Gwangyang (KR); Hee-Don Jeong, Pohang (KR)

(73) Assignee: Research Institute of Industrial Science & Technology, Kyungsangbook-Do (KR)

( * ) Notice: Subject to any disclaimer, the term of this patent is extended or adjusted under 35 U.S.C. 154(b) by 604 days.

(21) Appl. No.: 12/531,187

(22) PCT Filed: Mar. 13, 2007

(86) PCT No.: PCT/KR2007/001202
§ 371 (c)(1),
(2), (4) Date: Mar. 5, 2010

(87) PCT Pub. No.: WO2008/111692
PCT Pub. Date: Sep. 18, 2008

(65) Prior Publication Data
US 2010/0188510 A1  Jul. 29, 2010

(51) Int. Cl.
*G06F 19/00* (2011.01)
(52) U.S. Cl. .................... 348/164; 348/139; 700/245
(58) Field of Classification Search .............. 348/139, 348/164, E5.09; 700/245, 253, 258; 356/614; 901/1
See application file for complete search history.

(56) References Cited

U.S. PATENT DOCUMENTS

| | | | | |
|---|---|---|---|---|
| 6,041,274 | A * | 3/2000 | Onishi et al. | 901/1 |
| 7,184,586 | B2 | 2/2007 | Jeon et al. | |
| 7,634,336 | B2 * | 12/2009 | Chae et al. | 700/245 |
| 7,689,321 | B2 * | 3/2010 | Karlsson | 700/245 |
| 2002/0050518 | A1 * | 5/2002 | Roustaei | 235/454 |
| 2004/0016077 | A1 | 1/2004 | Song et al. | |
| 2005/0065655 | A1 * | 3/2005 | Hong et al. | 700/245 |
| 2005/0117781 | A1 | 6/2005 | Aoyama | |
| 2007/0216769 | A1 * | 9/2007 | Zganec et al. | 348/139 |

FOREIGN PATENT DOCUMENTS

| | | |
|---|---|---|
| EP | 1450129 | 8/2004 |
| JP | 02-235116 | 9/1990 |
| JP | 03-219309 | 9/1991 |

(Continued)

OTHER PUBLICATIONS

Richard I. Hartley, "An Algorithm for Self Calibration from Several Views", Jun. 1994. pp. 1-6.

(Continued)

*Primary Examiner* — Bharat N Barot
(74) *Attorney, Agent, or Firm* — Renner, Otto, Boisselle & Sklar, LLP

(57) ABSTRACT

There are provided a landmark for recognizing a position of a mobile robot moving in an indoor space and an apparatus and method for recognizing the position of the mobile robot by using the landmark. The landmark includes a position recognition part formed of a mark in any position and at least two marks on an X axis and Y axis centered on the mark and further includes an area recognition part formed of a combination of a plurality of marks to distinguish an individual landmark from others. The apparatus may obtain an image of the landmark by an infrared camera, detect the marks forming the landmark, and detect precise position and area information of the mobile robot from the marks.

14 Claims, 7 Drawing Sheets

FOREIGN PATENT DOCUMENTS

| | | |
|---|---|---|
| JP | 06-236208 | 8/1994 |
| JP | 2004-034272 | 2/2004 |
| JP | 2004-303137 | 10/2004 |
| JP | 2005-5164323 | 6/2005 |
| JP | 2006-234453 | 9/2006 |
| KR | 10-0483566 | 4/2005 |
| KR | 10-0485696 | 4/2005 |
| KR | 10-2005-0111137 | 11/2005 |
| KR | 10-0698534 | 3/2007 |
| KR | 10-0698535 | 3/2007 |

OTHER PUBLICATIONS

David Liebowitz et al., "Metric Rectification for Perspective Images of Planes", Jun. 1998. pp. 1-7.

International Search Report for corresponding application No. PCT/KR2007/001202 completed Dec. 7, 2007.

Japanese Office Action for corresponding Japanese Patent Application No. 2009-55496 mailed Oct. 18, 2011.

* cited by examiner (a)

(b)

LANDMARK FOR POSITION DETERMINATION OF MOBILE ROBOT AND APPARATUS AND METHOD USING IT

This application is a national phase of International Application No. PCT/KR2007/001202 filed Mar. 13, 2007 and published in the English language.

TECHNICAL FIELD

The present invention relates to a landmark for recognizing a position such as coordinates and an azimuth of a mobile robot and a position recognition apparatus and method using the landmark. More particularly, the present invention relates to a landmark with selective reflection characteristics to precisely and quickly obtain a position of a mobile robot from a landmark image obtained from a camera, a position recognition apparatus and method for obtaining the landmark image from an infrared camera and detecting area information in addition to precise position information of the mobile robot, and a position recognition apparatus and method for detecting a position of a mobile robot by correcting perspective distortion caused by an inclination of the mobile robot.

BACKGROUND ART

In general, to control an in-door robot moving indoors, it is required to recognize a position of the robot. Generally, there are two self-position calculation methods performed by a robot itself using a camera.

First, there is a method of using an artificial landmark. As shown in FIG. 1, a landmark 30 having a certain meaning is installed on a ceiling or a wall, the landmark 30 is photographed by a camera 20, the landmark 30 is extracted from an image, and coordinates on a screen are allowed to be identical with coordinates of a mobile robot 10, thereby calculating a self-position of the mobile robot 10 by itself (refer to Korean Patent No. 485696).

On the other hand, as shown in FIG. 2, the landmark 30 may be installed on a top of the mobile robot 10 and the camera 20 may be installed on the ceiling.

Second, there is a method of using a natural landmark. A ceiling is photographed by a camera, information of structures such as lightings installed on the ceiling and straight lines and edges of interfaces between the ceiling and walls is extracted, thereby calculating a self-position of a mobile robot by itself using the information (refer to Korean Patent No. 483566).

However, when using the artificial landmark, the artificial landmark may be affected by lightings and color information of the landmark may be distorted by sunlight. Also, when using the natural landmark, since the natural landmark is much affected by brightness of an ambient light and there is required odometer information or another robot position reader when recording a position of a feature of in the landmark, a large memory is required and an additional device is essential. Particularly, when there is no illumination, it is very difficult to use the natural landmark.

Accordingly, it is required a new self-position recognition method of a mobile robot, capable of being not affected by lightings and reducing a calculation of the image pre-processing.

Also, when using the two conventional methods described above, since coordinates of a camera and coordinates of a landmark attached to a ceiling calculate position information of a mobile robot while assuming that there is no rotation of in directions excluding the direction of gravity, the robot position information calculated using an image obtained by the camera may have many errors when the mobile robot goes over a small mound or is inclined by an external force or an inertial force of rapid acceleration or deceleration.

On the other hand, though there may be an initial correction for an inclination occurring when attaching one of a CMOS and CCD sensors used for a camera device to a robot, the initial correction is merely for an error occurring when initially installing but not for an error caused by an inclination occurring while the robot is actually driving.

DISCLOSURE OF INVENTION

Technical Problem

An aspect of the present invention provides a landmark for recognizing a position of a mobile robot, the landmark capable of allowing one of position and area information of the mobile robot to be detected from a landmark image photographed by a camera and being recognized regardless of indoor lightings.

An aspect of the present invention also provides an apparatus and method for recognizing a position of a mobile robot, in which an image of the landmark is obtained by an infrared camera and the position and an area information of the mobile robot can be obtained without particular preprocessing the obtained image.

An aspect of the present invention also provides an apparatus and method for recognizing a position of a mobile robot, the apparatus having an inclination correction function to precisely recognizing the position of the mobile robot by correcting position information of an image of a landmark photographed by an infrared camera by measuring inclination information of the mobile robot, such as a roll angle and a pitch angle, by using a 2-axis inclinometer.

Technical Solution

According to an aspect of the present invention, there is provided a landmark for recognizing coordinates and azimuth information of a mobile robot, the landmark including a position recognition part formed of a mark in any position and at least two marks on an X axis and Y axis centered on the mark.

The landmark may further include an area recognition part formed of a combination of a plurality of marks to distinguish an individual landmark from others.

According to another aspect of the present invention, there is provided an apparatus for recognizing a position of a mobile robot, the apparatus including: an infrared lighting unit irradiating an infrared ray to a landmark formed of a plurality of marks reflecting the infrared; an infrared camera photographing the landmark and obtaining a binary image; a mark detector labeling a partial image included in the binary image and detecting the mark by using a number and/or dispersion of labeled pixels for each the partial image; and a position detector detecting coordinates and an azimuth of the mobile robot by using centric coordinates of the detected mark.

The infrared camera may be formed together with the infrared lighting unit as in one body.

According to still another aspect of the present invention, there is provided a method of recognizing a position of a mobile robot, the method including: (a) obtaining a binary image by irradiating an infrared ray to a landmark including a position recognition part formed of a mark in any position and at least two marks located on an X axis and Y axis centered on the mark to reflect the infrared ray and photographing the landmark; (b) labeling a partial image included in the binary image and detecting the mark by using a number and/or dispersion of labeled pixels for each the partial image; and (c) detecting coordinates and an azimuth of the mobile robot by using centric coordinates of the detected mark.

According to yet another aspect of the present invention, there is provided an apparatus for recognizing a position of a mobile robot, the apparatus including: an infrared lighting unit irradiating an infrared ray to a landmark form of a plurality of marks reflecting the infrared ray and attached to a predetermined space; an infrared camera installed in the mobile robot and photographing the landmark and obtaining a binary image; a 2-axis inclinometer installed in the mobile robot and detecting inclination information of the mobile robot; a mark detector labeling a partial image included in the binary image and detecting the mark by using a number and/or dispersion of labeled pixels for each the partial image; and a position detector detecting coordinates and an azimuth of the mobile robot by using centric coordinates of the detected mark and the inclination information of the mobile robot, wherein the apparatus has an inclination correction function.

The landmark may include a position recognition part formed of a mark in any position and at least two marks located on an X axis and Y axis centered on the mark.

According to a further aspect of the present invention, there is provided a method of recognizing a position of a mobile robot having an inclination correction function, the method including: (a) obtaining a binary image by irradiating an infrared ray to a landmark including a position recognition part formed of a mark in any position and at least two marks located on an X axis and Y axis centered on the mark to reflect the infrared ray and photographing the landmark; (b) detecting 2-axis inclination information of the mobile robot to the ground and obtaining a binary image again when the detected 2-axis inclination information is more than a predetermined threshold; (c) labeling a partial image included in the binary image and detecting the mark by using a number and/or dispersion of labeled pixels for each the partial image; and (d) detecting coordinates and an azimuth of the mobile robot by using centric coordinates of the detected mark.

Coordinates and an azimuth of the mobile robot may be detected by correcting the centric coordinates of the detected mark by using a coordinate transformation matrix according to the 2-axis inclination information.

Advantageous Effects

According to a landmark for recognizing the position of a mobile robot and a position recognition apparatus and method using the landmark according to an exemplary embodiment of the present invention, the mobile robot may be free from lightings in a space by using an infrared image and not only a position update rate may be improved but also the landmark may be employed by a robot moving at a high speed more than 30 cm/s, due to omission of preprocessing an image.

Also, a position of the mobile robot is precisely recognized by a position recognition part formed of three marks and an identifier (ID) is given to a landmark by an area recognition part formed of multiple marks, thereby applying the mobile robot to a complicated and broad indoor space.

According to an apparatus and method of recognizing a position of a mobile robot having an inclination correction function according to an exemplary embodiment of the present invention, since an error due to perspective distortion caused by an inclination of the mobile robot may be corrected, thereby precisely recognizing a position of the mobile robot in various environments.

Also, when combining position information such as coordinates and an azimuth of the mobile robot with inclination information, rotation angle information of 3-axis of the mobile robot may be obtained, thereby also obtaining inertia information without additionally attaching an inertial measurement unit (IMU) to the mobile robot.

BRIEF DESCRIPTION OF DRAWINGS

FIG. 4($b$) is a diagram illustrating a cross-section cut along a line A-A' of FIG. 4($a$);

FIG. 5($b$) is a diagram illustrating a cross-section cut along a line A-A' of FIG. 5($b$);

BEST MODE FOR CARRYING OUT THE INVENTION

The present invention relates a landmark for recognizing position information such as coordinates and an azimuth of a mobile robot and a position recognition apparatus and method using the landmark. A landmark 30 for recognizing a position of a mobile robot, according to an embodiment of the present invention, will be described with reference to FIGS. 1 through 3.

Figure 1:
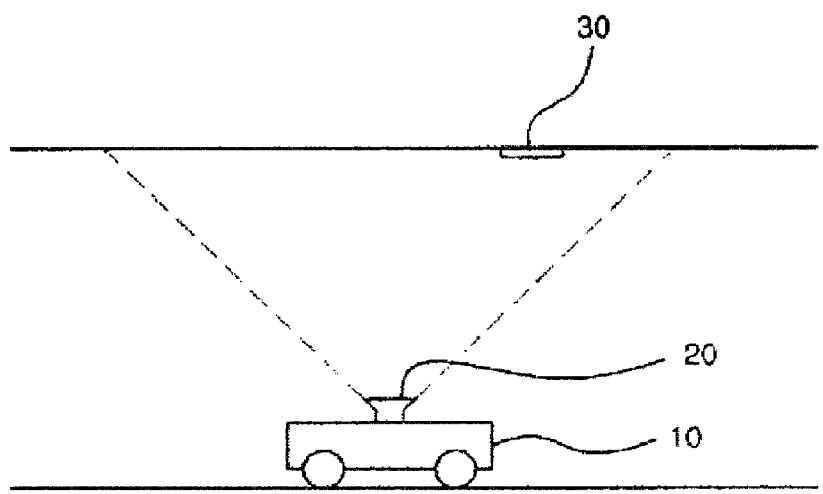
FIG. 1 is a schematic diagram illustrating a camera of a mobile robot photographing a landmark attached to a ceiling of an indoor space.
Figure 2:
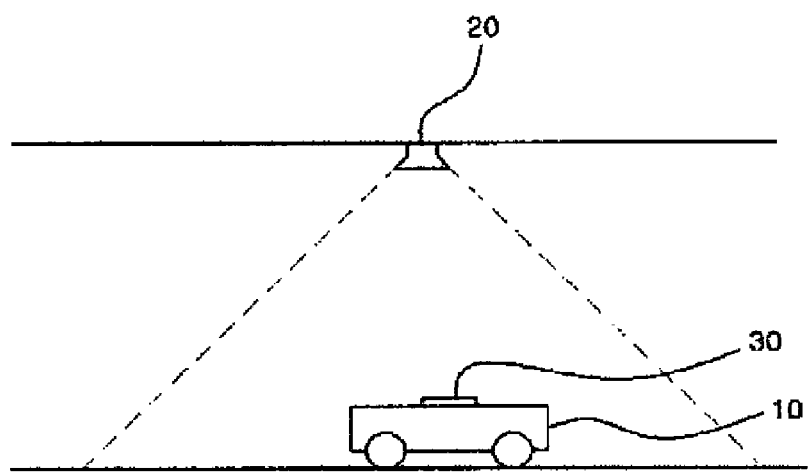
FIG. 2 is a schematic diagram illustrating a camera of a ceiling, which photographs a landmark attached to a mobile robot.

The landmark according to an embodiment of the present invention is attached to a ceiling of a space, in which the mobile robot moves, and is photographed by a camera installed on the mobile robot as shown in FIG. 1 or attached to a top of the mobile robot and photographed by a camera installed on the ceiling as shown in FIG. 2 to be used for recognizing the position of the mobile robot.

Figure 3:
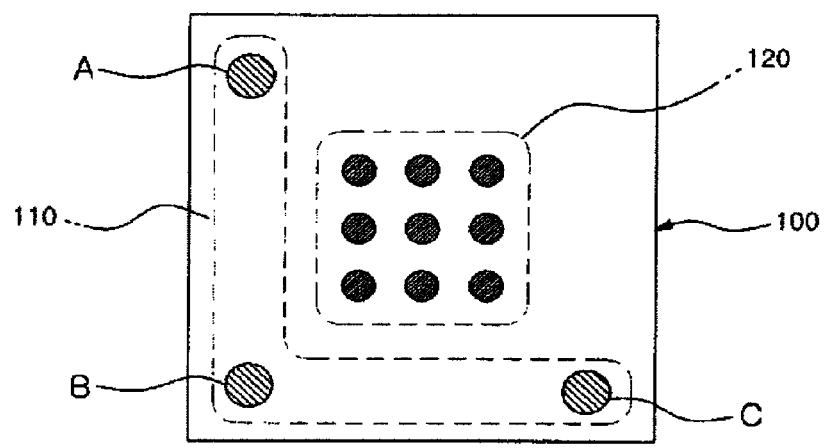
FIG. 3 is a configuration diagram illustrating a landmark according to an embodiment of the present invention.

Referring to FIG. 3, a landmark 100 according to an exemplary embodiment of the present invention includes a position recognition part 110 formed of three marks to recognize essential position information such as coordinates and an azimuth of a mobile robot and an area recognition part 120 formed of a plurality of marks to distinguish an individual landmark 100 from others to recognize additional area information of the mobile robot.

The position recognition part 110 is formed of one mark B in any position and two marks C and A located on an X axis and Y axis, respectively, centered on the mark B. The three marks B, A, and C provide the landmark 100 with a reference point and reference coordinates. Though there are two marks shown in FIG. 3, the number of the marks is not limited to this and more than two marks may be used.

Though the area recognition part 120 is formed of 3×3 marks inside the position recognition part 110 as shown in FIG. 3, a position and the number of the marks forming the position recognition part 110 may be varied according to purpose. By giving an ID corresponding to the number and the position of each of the marks forming the area recognition part 120, each individual landmark 100 may be distinguished from others. As shown in FIG. 3, when the area recognition part 120 is formed of the 3×3 marks, IDs of 512 is given. In this case, the position of the mark forming the area recognition part 120 may be determined according to the reference coordinates provided by the position recognition part 110 and each of the IDs may be binary coded, thereby quickly recognizing area information of the mobile robot.

On the other hand, an infrared reflection coating may be applied or a reflection sheet may be attached to the marks forming the landmark 100 in order to diffusely reflect an infrared ray in a certain wavelength band, particularly, a wavelength band of 800 to 1200 nm. Accordingly, not only in the night but also when there exist reflected lights, only an infrared ray reflected by the mark is detected by using an infrared camera, thereby quickly recognizing the position of the mobile robot without using particular image preprocessing methods.

In this case, the mark may be formed in the shape of only a circle of a predetermined size or may be formed in the protruded shape of one of a circle on a plane and a hemisphere from a plane. The mark formed in the shape of one of the circle and the hemisphere may be used for easily obtaining a number, dispersion, and centric coordinates of pixels when detecting the mark.

Though the marks may be formed identically with each other, the marks for the position recognition part 110 are formed different from those for the area recognition part 120 in size and/or color, thereby easily distinguishing the position recognition part 110 from the area recognition part 120.

The mark forming the landmark 100, described above, may be applied to a conventional mobile robot position recognition apparatus without using an infrared camera, and a use of the marks is not limited to a position recognition apparatus according to an exemplary embodiment of the present invention.

Figure 4:
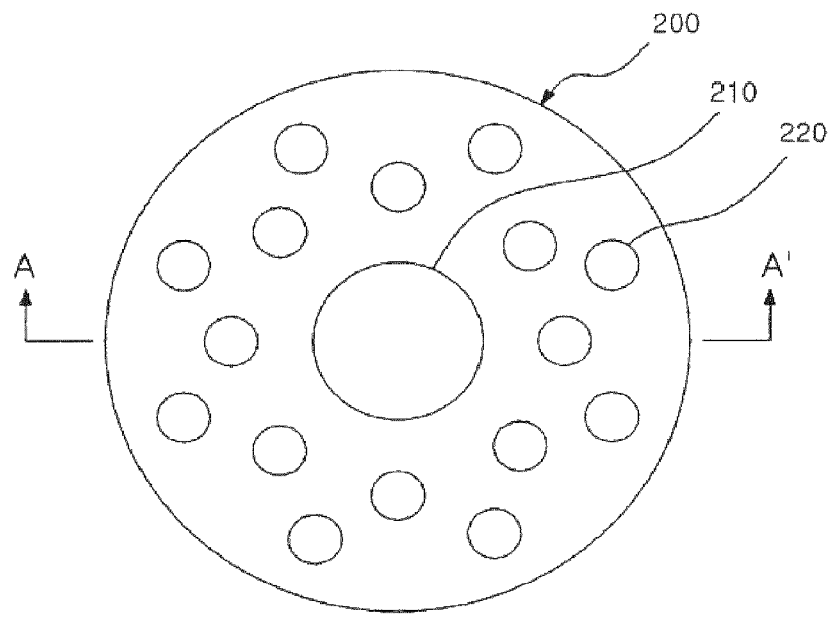
FIG. 4($a$) is a top view illustrating a position recognition apparatus of a mobile robot according to an embodiment of the present invention.
Figure 4:
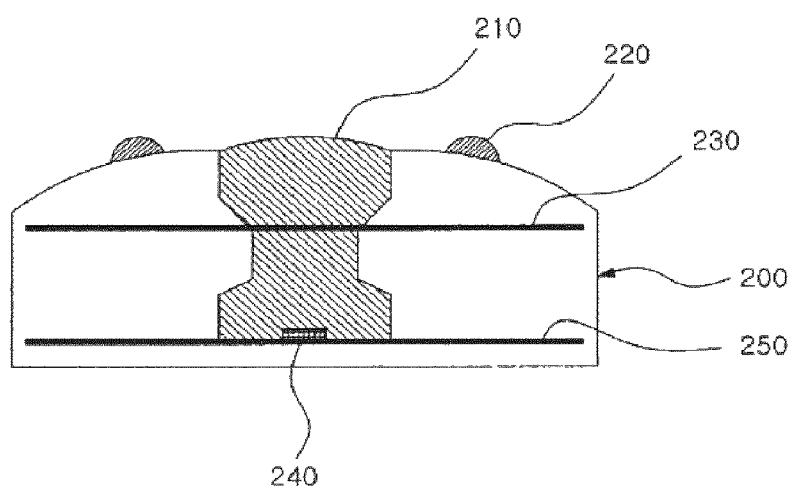

Next, an apparatus and method for recognizing a position of a mobile robot, according to an exemplary embodiment of the present invention, will be described in the order of operations by referring to FIGS. 3, 4(a), and 4(b).

The embodiment may be applied to when a space in which the mobile robot moves or a space to which a landmark is attached has no bend and is flat.

(a) An infrared light emitting diode (LED) 220 irradiates an infra ray to the landmark 100 and an image reflected by the mark forming the position recognition part 110 is photographed by a camera 200, thereby obtaining a binary image. Namely, the mark in the image obtained by the camera 200 is set up as a bright light close to white and is converted into the binary image by selecting a predetermined threshold brightness value.

Considering the camera 200 in detail, as shown in FIGS. 4(a) and 4(b), the camera 200 includes a plurality of infrared LEDs 220, an infrared light controller 230, a CMOS array 240, and a vision controller 250 around a wide angle lens 210. The camera 200 is installed on one of the mobile robots and a ceiling of a space in which the mobile robot moves, to obtain an image of the landmark 100 attached to one of the ceiling, a wall, and a top of the mobile robot.

(b) A partial image brightly displayed in the binary image is labeled, and the mark is detected from the number and/or dispersion of the labeled pixel. In this case, labeling indicates a procedure of recognizing an individual image, giving a reference number to the individual image, and making a label list to know a position and a size of the partial image brightly displayed in the binary image. After the labeling, centric coordinates are obtained for each label and the mark is detected from the number and/or dispersion of the labeled pixels.

There may be various methods of detecting a mark from a label list. For example, one method may limit the number of pixels forming a label. Namely, since the mark is formed in the shape of a circle and has a uniform size, only a label having a certain number of pixels is selected as a mark candidate and labels having pixels more or less than the certain number are deleted from the label list.

Another method may determine a predetermined dispersion value corresponding to a dispersion index with respect to centric coordinates from the labels and delete labels in which pixels are not clustered from the label list, thereby determining a mark candidate, since the marks are clustered in the shape of a circle.

The two methods of detecting a mark from labels, described above, may be used selectively or simultaneously if necessary.

On the other hand, when only the marks of the position recognition part 110 exist in the landmark 100, three marks may be detected by using the above methods. However, when there are the marks of the area recognition part 120, whose size is identical with the mark of the position recognition part 110, only the marks corresponding to the position recognition part 110 may be separately detected from the total marks by performing an additional process as follows.

Namely, three labels whose distances from each other are similar and located in the shape of a right angle are detected from the determined mark candidates, thereby detecting the marks of the position recognition part 110. For example, an inner product of vectors connecting labels is obtained and a label whose inner product value is closest to a largest valid inner product value is detected, thereby detecting only the marks of the position recognition part 110 from the total marks.

When indexes of labels corresponding to A, B, and C of FIG. 3 are designated by i, j, and k and a largest valid value of an inner product of vectors between the labels is $_{th}$, indexes whose difference of magnitudes is smallest among indexes whose inner product value corresponds to a range is obtained by using Equation 1.

$$\{i,j,k\} = \arg_{i,j,k} \min D(i,j,k)$$

$$D(i,j,k) = |\|\vec{ij}\| - \|\vec{kj}\||, \text{ where } (i,j,k) = \arg_{i,j,k} |\vec{ij} \cdot \vec{kj}| \langle \delta_{th} \quad \text{Equation (1)}$$

When an existence and a position of the mark has been recognized by using Equation 1, an identifier (ID) of the mark may be easily obtained by calculating the position by using a sum of position values and detecting whether the label exists in the position.

(c) Position information such as coordinates and an azimuth and area information of the mobile robot are detected by using the detected mark.

The ID determined according to the number and position of the marks corresponding to the area recognition part 120 from the detected marks may be quickly obtained, and the area information of the mobile robot may be obtained. In this case, the area information of the mobile robot is allocated to the ID and is an approximate position in which the mobile robot is located.

Detailed position information of the mobile robot, such as the coordinates and the azimuth, may be obtained by using centric coordinates of the detected three marks A, B, and C forming the position recognition part 110.

According to an exemplary embodiment of the present invention, coordinates of the mobile robot may be obtained by considering any point obtained from the centric coordinates of each of the three marks A, B, and C shown in FIG. 3 as reference coordinates. In this case, the any point may be a center of gravity obtained by the centric coordinates of the three marks. In this case, since the center of gravity is an average of errors with respect to the centric coordinates of the three marks, an error with respect to the coordinates of the mobile robot obtained by using the center of gravity may be reduced.

An azimuth of the mobile robot may be obtained based on one direction vector obtained by three centric coordinates, for example, a direction vector obtained by summation of a vector from B to A and a vector from B to C.

A vector allowing both the coordinates and the azimuth of the mobile robot to be known may be obtained by using a calibration equation, which is disclosed in detail in several theses as follows.

R. I. Hartley. An algorithm for self calibration from several views. In *Proceedings of the IEEE Conference on Computer Vision and Pattern Recognition*, pages 908-912, Seattle, Wash., June 1994. IEEE.

D. Liebowitz and A. Zisserman. Metric rectification for perspective images of planes. In *Proceedings of the IEEE Conference on Computer Vision and Pattern Recognition*, pages 482-488, Santa Barbara, Calif., June 1998. IEEE Computer Society.

The calibration equation is shown as follows.

$$s\tilde{m} = A[Rt]\tilde{M} \Longrightarrow$$
$$\tilde{m} = \frac{1}{s}A(RM+t)$$

Equation (2)

where
$\tilde{m}_0$
is projected pixel coordinates corresponding to a reference position of the mobile robot, $R_o$ and $t_0$ are a rotation matrix and a displacement vector, respectively, s is a scale value, A is a calibration matrix,
$\tilde{m}_1$
is pixel coordinates of a position to which the mobile robot rotates and moves, $R_1$ is a matrix corresponding to a rotation angle amount, and $t_1$ is a displacement vector, Equations 3 and 4 may be obtained by using Equation 2.

$$\tilde{m}_0 = \frac{1}{s}A(R_0 M + t_0)$$

Equation (3)

$$\tilde{m}_1 = \frac{1}{s}A(R_0 R_1 M + R_1 t_1)$$

Equation (4)

A coordinate value M is obtained by using Equation 3, and the obtained value is assigned to Equation 4. In Equation 4, $R_1$ may be calculated by using a sum of vectors of the recognized marks. Since all values in Equation 4 excluding $t_1$ are known, the displacement vector $t_1$ may be calculated. That is, the displacement vector of the mobile robot may be obtained by using Equation 5.

$$t_1 = sR_1^{-1}A^{-1}\tilde{m}_1 - R_0 M$$

Equation (5)

As described above, the vector allowing the coordinates and the azimuth of the mobile robot to be simultaneously known may be obtained by using the detected three marks of the position recognition part 110 and a vector operation using the calibration equation, thereby embodying a microprocessor at a low price.

Also, brief area information and detailed position information such as the coordinates and azimuth of the mobile robot may be converted into code information. The code information is transmitted to the mobile robot to perform necessary operations.

An apparatus and method of recognizing a position of a mobile robot having an inclination correction function, according to another embodiment of the present invention will be described referring to FIGS. 3, 5(*a*), 5(*b*), and 6 to 8. The apparatus of FIGS. 5(*a*) and 5(*b*) further includes a 2-axis inclinometer, which is different from the apparatus of FIGS. 4(*a*) and 4(*b*).

(a) An infrared light emitting diode (LED) 220 irradiates an infra ray to the landmark 100 and an image reflected by the mark forming the position recognition part 110 is photographed by a camera 200, thereby obtaining a binary image. Namely, the mark in the image obtained by the camera 200 is set up as a bright light close to white and is converted into the binary image by selecting a predetermined threshold brightness value.

Figure 5:
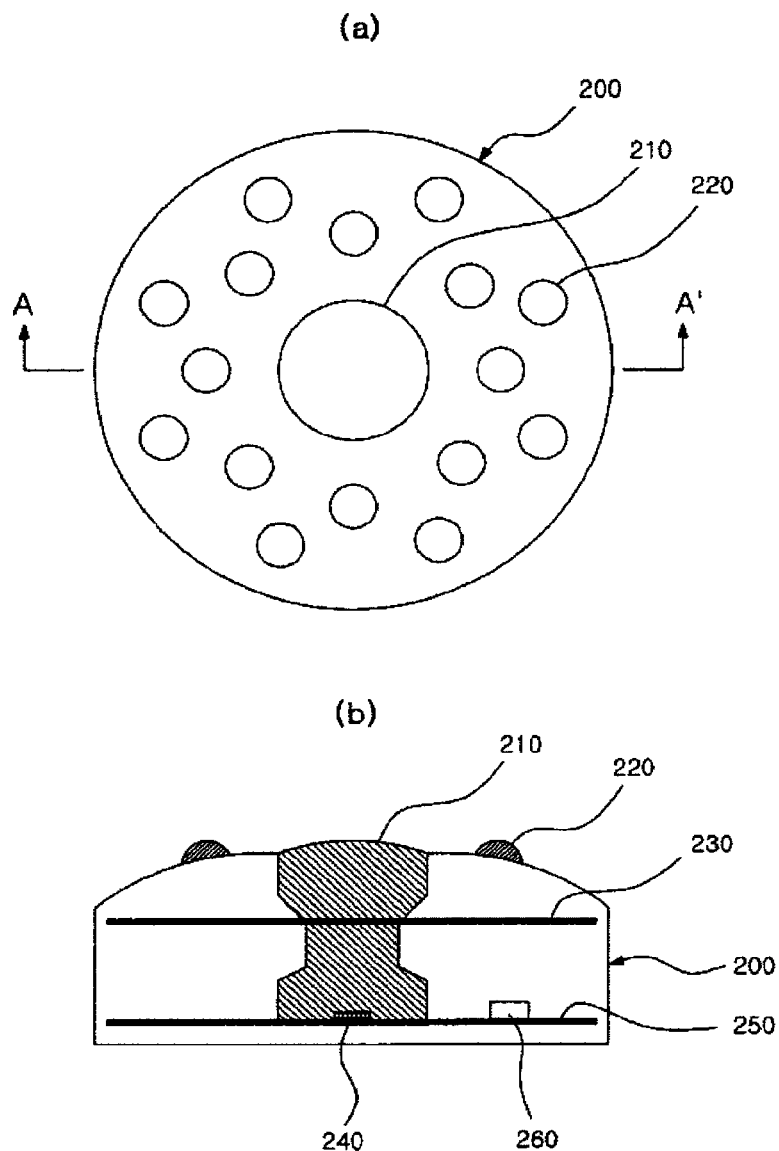
FIG. 5($a$) is a top view illustrating a position recognition apparatus of a mobile robot according to another embodiment of the present invention.

Considering the camera 200 in detail, as shown in FIGS. 5(*a*) and 5(*b*), the camera 200 includes a plurality of infrared LEDs 220, an infrared light controller 230, a CMOS array 240, a vision controller 250, and a 2-axis inclinometer 260 around a wide angle lens 210. The camera 200 is installed on the mobile to obtain an image of the landmark 100 attached to one of the ceiling and a wall.

(b) As shown in FIG. 5(*b*), 2-axis inclination information with respect to a direction of gravity of the mobile robot is detected from the 2-axis inclinometer 260 installed on a body of the camera 200. In this case, the 2-axis inclination information includes a roll angle and a pitch angle with respect to the direction of gravity.

Since the detected inclination information within a predetermined threshold is valid, when the inclination information is above the predetermined threshold, a further binary image is obtained by the camera 200 until the inclination information is valid.

(c) A partial image brightly displayed in the binary image is labeled, and the mark is detected from the number and/or dispersion of labeled pixels. In this case, labeling indicates a procedure of recognizing an individual image, giving a reference number to the individual image, and making a label list to know a position and a size of the partial image brightly displayed in the binary image. After the labeling, centric coordinates are obtained for each label and the mark is detected from the number and/or dispersion of the labeled pixels.

There may be various methods of detecting a mark from a label list. For example, one method may limit the number of pixels forming a label. Namely, since the mark is formed in the shape of a circle and has a uniform size, only a label having a certain number of pixels is selected as a mark candidate and labels having pixels more or less than the certain number are deleted from the label list.

Another method may determine a predetermined dispersion value corresponding to a dispersion index with respect to centric coordinates from the labels and delete labels in which pixels are not clustered from the label list, thereby determining a mark candidate, since the marks are clustered in the shape of a circle.

The two methods of detecting a mark from labels, described above, may be used selectively or simultaneously if necessary.

On the other hand, three labels whose distances from each other are similar and located in the shape of a right angle are detected from the determined mark candidates, thereby detecting the marks of the position recognition part 110. For example, inner products of vectors connecting labels are obtained and a label whose inner product value is closest to a largest valid inner product value is detected, thereby detecting only the marks of the position recognition part 110 from the total marks.

When indexes of labels corresponding to A, B, and C of FIG. 3 are designated by i, j, and k and a largest valid value of an inner product of vectors between the labels is $_{th}$, indexes whose difference of magnitude is smallest among indexes whose inner product value corresponds to a range is obtained by using Equation 1.

$$\{i,j,k\} = \arg_{i,j,k} \min D(i,j,k)$$

$$D(i,j,k) = \|\|\vec{ij}\| - \|\vec{kj}\|\|, \text{ where } (i,j,k) = \arg_{i,j,k} |\vec{ij} \cdot \vec{kj}| \langle \delta_{th} \quad \text{Equation (6)}$$

(d) Position information such as coordinates and an azimuth of the mobile robot is detected by using the detected mark and the 2-axis inclination information.

The detailed position of the mobile robot, such as the coordinates and the azimuth of the mobile robot, may be obtained by using centric coordinates of the detected three marks A, B, and C forming the position recognition part 110.

According to an exemplary embodiment of the present invention, coordinates of the mobile robot may be obtained by considering any point obtained from the centric coordinates of each of the three marks A, B, and C shown in FIG. 3 as reference coordinates. In this case, the any point may be a center of gravity obtained by the centric coordinates of the three marks. In this case, since the center of gravity is an average of errors with respect to the centric coordinates of the three marks, an error with respect to the coordinates of the mobile robot obtained by using the center of gravity may be reduced.

An azimuth of the mobile robot may be obtained based on one direction vector obtained by three centric coordinates, for example, a direction vector obtained by summation of a vector from B to A and a vector from B to C.

However, since the shape of the landmark included in the image obtained by the camera 200 is distorted when the mobile robot inclines, the centric coordinates of the detected mark is corrected by using the inclination information of the mobile robot within the predetermined threshold detected by the 2-axis inclinometer 260, and a coordinate transformation matrix.

Hereinafter, a method will be described of obtaining a vector allowing coordinate and azimuth information of the mobile robot to be known by using a calibration equation.

Figure 6:
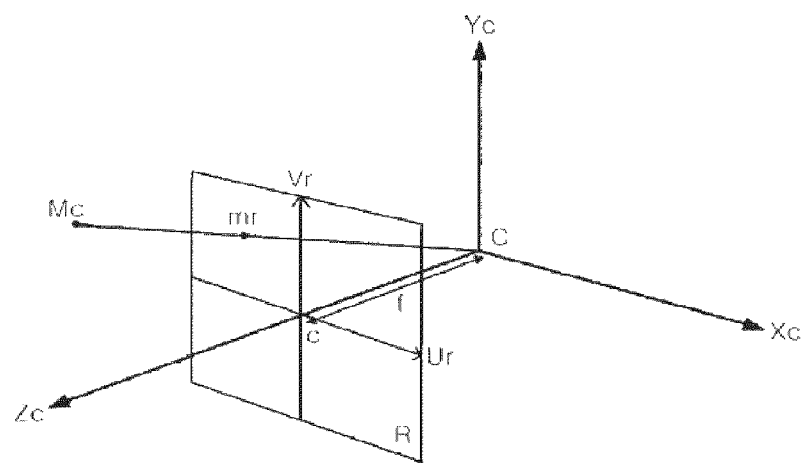
FIG. 6 is a diagram illustrating a coordinate system of a pinhole model.

A pinhole model is a generally used cameral model when describing an image process. FIG. 6 is a configuration diagram illustrating the pinhole model.

Referring to FIG. 6, a point $m_r$ of a point $M_c$ on a three-dimensional space corresponds to a point at which a straight line connecting the point $M_c$ to a point C meets with a plane r. In this case, the point C is designated as an optical center, and the plane r is designated as a retinal plane. A straight line passing the point C and vertical to the plane r may exist, which is designated as an optical axis.

Generally, the point C is allowed to be an origin point of camera coordinates, and the optical axis is allowed to be identical with Z axis of an orthogonal coordinate system.

After the camera model is determined, a structure of the camera may be expressed with various parameters. The parameters may be divided into two kinds of parameters used for describing a camera, intrinsic parameters and extrinsic parameters. The intrinsic parameters describe corresponding relationships between points on the camera coordinates, which is expressed with in three-dimensional coordinates, the retinal plane with two-dimensional coordinates, where the points are projected. The extrinsic parameters describe a transform relationship between the camera coordinates and world coordinates.

Hereinafter, the intrinsic parameters will be described.

Figure 7:
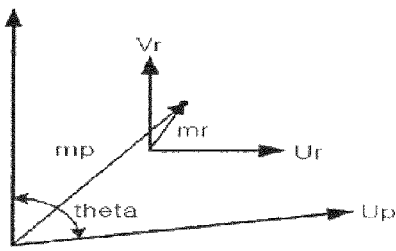
FIG. 7 is a diagram illustrating a coordinate system when a camera is not at a right angle.

Referring to FIG. 7, it may be known that a relationship between a point $M_c = [X_c\ Y_c\ Z_c]^T$ on the camera coordinates and a point $m_r = [u_r\ v_r]T$ on the corresponding retinal plane is provided as follows.

$$\begin{cases} u_r = f \dfrac{X_c}{Z_c} \\ v_r = f \dfrac{Y_c}{Z_c} \end{cases} \quad \text{Equation (7)}$$

wherein f indicates a focal length that is a distance between the optical center C and a point c at which the optical axis meets the retinal plane. The point c indicates a principal point.

A phase formed on the retinal plane is sampled by the CCD array, converted into a video signal, outputted from the camera, and stored in a frame buffer. Accordingly, a finally obtained coordinate value is not a coordinate value of the retinal plane but a pixel coordinate value. When pixel coordinates corresponding to $m_r$ is $m_p = [u_p\ v_p]^T$, a transform relationship between the two coordinates is provided as follows.

$$\begin{cases} u_p = k_u u_r + u_0 \\ v_p = k_v v_r + v_0 \end{cases} \quad \text{Equation (8)}$$

wherein $\alpha$ and $\beta$ are values indicating a scale transformation between the two coordinates and $u_0$ and $v_0$ are pixel coordinates values of the principal point c. The relationship given by Equation 8 is effective when an array of the CCD array is formed by a perfect right angle. However, since it is actually difficult to form a perfect right angle, it is required to obtain a relationship equation considering the difficulty. As shown in FIG. 7, when an angle formed by both axes forming the pixel coordinates is designated as $\theta$, there is a relationship between coordinates on the retinal plane and the pixel coordinates, as follows.

$$\begin{cases} u_p = k_u u_r - k_u \cot\theta v_r + u_0 \\ v_p = k_v \csc\theta v_r + v_0 \end{cases} \quad \text{Equation (9)}$$

When applying Equation 7 to Equation 9, a relationship equation between the three-dimensional coordinates on the camera coordinates and the pixel coordinates is finally obtained as follows.

$$\begin{cases} u_p = \alpha_u \frac{X_c}{Z_c} - \alpha_u \cot\theta \frac{Y_c}{Z_c} + u_0 = \alpha \frac{X_c}{Z_c} + \gamma \frac{Y_c}{Z_c} + u_0 \\ v_p = \alpha_r \csc\theta \frac{Y_c}{Z_c} + v_0 = \beta \frac{Y_c}{Z_c} + v_0 \end{cases}$$ Equation (10)

As described above, the intrinsic parameters are formed of five such as $\alpha$, $\beta$, $\gamma$, $u_0$, and $v_0$.

Hereinafter, the extrinsic parameters will be described.

Generally, points on a three-dimensional space are described in different coordinates from the camera coordinates, the coordinates generally designated as world coordinates. Accordingly, a transformation equation from the world coordinates to the camera coordinates is required, the transformation equation capable of being shown by a displacement vector indicating a relative position between origin points of respective coordinates and a rotation matrix showing a rotation amount of each coordinate axis.

When a point shown in world coordinates is $M_w=[X_w\ Y_w\ Z_w]^T$ and is converted into $M_c$ in the camera coordinates, a relationship equation between $M_w$, and $M_c$ is shown as follows.

$$M_c = R(M_w + t)$$ Equation (11)

wherein R indicates the rotation matrix and t indicates the displacement vector. Since R includes three independent parameters and t also includes three independent parameters, the number of extrinsic parameters is six.

Hereinafter, it will be described to show a camera mode using projective geometry.

A pinhole model of a camera may be linearly shown by using a concept of homogeneous coordinates. When a point on two-dimensional pixel coordinates is defined as $m=[u,v]^T$ and the coordinates on three-dimensional world coordinates corresponding to the point, are defined as $M=[X\ Y\ Z]^T$, homogeneous coordinates formed by adding 1 to the last term of the coordinates become
$\tilde{m}=[u, v, 1]^T$, and
$\tilde{M}=[X, Y, Z, 1]^T$. A relationship equation between the three-dimensional point M and m that is formed by projecting the point M is expressed using the described pinhole model as follows.

$$s\tilde{m} = A[Rt]\tilde{M}$$ Equation (12)

wherein s is a scale factor and R and t are a rotation matrix and a displacement vector, respectively, which are extrinsic parameters. A is a matrix of the intrinsic parameter and is designated as a calibration matrix.

$$A = \begin{vmatrix} \alpha & \gamma & u_0 \\ 0 & \beta & v_0 \\ 0 & 0 & 1 \end{vmatrix}$$ Equation (13)

wherein $\alpha$ and $\beta$ correspond to scale values to u and v axes, $\gamma$ corresponds to a skewness of two image axes, and $u_0$ and $v_0$ are principal points.

A vector allowing the coordinates and the azimuth of the mobile robot to be known may be obtained by using a calibration equation, which is disclosed in detail in several theses as follows.

R. I. Hartley. An algorithm for self calibration from several views. In *Proceedings of the IEEE Conference on Computer Vision and Pattern Recognition*, pages 908-912, Seattle, Wash., June 1994. IEEE.

D. Liebowitz and A. Zisserman. Metric rectification for perspective images of planes. In *Proceedings of the IEEE Conference on Computer Vision and Pattern Recognition*, pages 482-488, Santa Barbara, Calif., June 1998. IEEE Computer Society.

Figure 8:
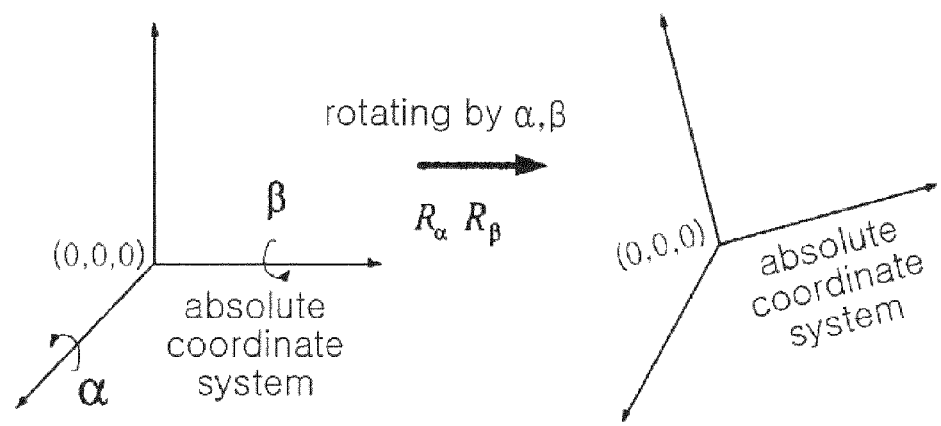
FIG. 8 is a diagram illustrating a coordinate system when a camera rotates.

A transform relationship of projecting a point on world coordinates to camera pixel coordinates will be described referring to FIG. 8.

When a roll angle and a pitch angle corresponding to inclination of a camera are $\alpha$ and $\beta$, respectively, such a degree of inclination as $\alpha$ and $\beta$ is expressed in a matrix as follows.

$$R_\alpha = \begin{vmatrix} 1 & 0 & 0 \\ 0 & \cos\alpha & \sin\alpha \\ 0 & -\sin\alpha & \cos\alpha \end{vmatrix}$$ Equation (14)

$$R_\beta = \begin{vmatrix} \cos\beta & 0 & \sin\beta \\ 0 & 1 & 0 \\ -\sin\beta & 0 & \cos\beta \end{vmatrix}$$ Equation (15)

wherein homogeneous pixel coordinates $\tilde{m}_{\alpha\beta}$ corresponding to a scale parameter are obtained as follows.

$$s\tilde{m}_{\alpha\beta} = R_\alpha R_\beta A[Rt]\tilde{M}$$ Equation (16)

When assuming the displacement vector t to be known, the point M on the world coordinates may be obtained as follows.

$$M = sR^T(A^{-1}R_\beta^T R_\alpha^T \tilde{m}_{\alpha\beta} - t)$$ Equation (17)

When the point M corresponding to a reference point is known, the displacement vector t that is finally to be calculated is obtained as follows, thereby calculating a self-position of the mobile robot.

$$t = sA^{-1}R_\beta^T R_\alpha^T \tilde{m}_{\alpha\beta} - RM$$ Equation (18)

As described above, the vector amount allowing the coordinates and azimuth of the mobile robot to be simultaneously known may be obtained by the vector operation using the three detected marks of the position recognition part 110 and the calibration equation, thereby embodying a microprocessor at a low price.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for recognizing a position of a mobile robot, the apparatus comprising: an infrared lighting unit irradiating an infrared ray to a landmark form of a plurality of marks reflecting the infrared ray and attached to a predetermined space; an infrared camera installed in the mobile robot and photographing the landmark and obtaining a binary image; a 2-axis inclinometer installed in the mobile robot and detecting inclination information of the mobile robot; a mark detector labeling a partial image included in the binary image and detecting the mark by using a number and/or dispersion of labeled pixels for each the partial image; and a position detector detecting coordinates and an azimuth of the mobile robot by using centric coordinates of the detected mark and the inclination in formation of the mobile robot, wherein the apparatus has an inclination correction function.

2. The apparatus of claim 1, wherein the landmark comprises a position recognition part formed of a mark in any position and at least two marks located on an X axis and Y axis centered on the mark.

3. A method of recognizing a position of a mobile robot having an inclination correction function, the method comprising:
   (a) obtaining a binary image by irradiating an infrared ray to a landmark including a position recognition part formed of a mark in any position and at least two marks located on an X axis and Y axis centered on the mark to reflect the infrared ray and photographing the landmark;
   (b) detecting 2-axis inclination information of the mobile robot to the ground and obtaining a binary image again when the detected 2-axis inclination information is more than a predetermined threshold;
   (c) labeling a partial image included in the binary image and detecting the mark by using a number and/or dispersion of labeled pixels for each the partial image; and
   (d) detecting coordinates and an azimuth of the mobile robot by using centric coordinates of the detected mark.

4. The method of claim 3, wherein coordinates and an azimuth of the mobile robot are detected by correcting the centric coordinates of the detected mark by using a coordinate transformation matrix according to the 2-axis inclination information.

5. An apparatus for recognizing a position of a mobile robot, the apparatus comprising:
   an infrared lighting unit irradiating an infrared ray to a landmark formed of a plurality of marks reflecting the infrared;
   an infrared camera photographing the landmark and obtaining a binary image;
   a mark detector labeling a partial image included in the binary image and detecting the mark by using a number and/or dispersion of labeled pixels for each the partial image; and
   a position detector detecting coordinates and an azimuth of the mobile robot by using centric coordinates of the detected mark.

6. The apparatus of claim 5, wherein the infrared camera is formed together with the infrared lighting unit as in one body.

7. The apparatus of claim 6, wherein the landmark is installed on a top of the mobile robot, and the infrared camera is installed in a predetermined space capable of photographing the mobile robot.

8. The apparatus of claim 5, wherein the landmark comprises a position recognition part formed of a mark in any position and at least two marks located on an X axis and Y axis centered on the mark.

9. The apparatus of claim 8, wherein the landmark further comprises an area recognition part formed of a combination of a plurality of marks to distinguish an individual landmark from others, and
   the position detection unit further detects area information of the mobile robot by using the detected mark.

10. The apparatus of claim 9, wherein the area recognition part receives an identifier corresponding to a number and position of each of the marks forming the area recognition part to distinguish the individual landmark from the others.

11. A method of recognizing a position of a mobile robot, the method comprising:
    (a) obtaining a binary image by irradiating an infrared ray to a landmark including a position recognition part formed of a mark in any position and at least two marks located on an X axis and Y axis centered on the mark to reflect the infrared ray and photographing the landmark;
    (b) labeling a partial image included in the binary image and detecting the mark by using a number and/or dispersion of labeled pixels for each the partial image; and
    (c) detecting coordinates and an azimuth of the mobile robot by using centric coordinates of the detected mark.

12. The method of claim 11, wherein a mark candidate is selected by using the number and/or dispersion of labeled pixels for each the partial image and three marks corresponding to the position recognition part are detected by using an inner product of a vector connecting the selected labels in operation (b).

13. The method of claim 11, wherein the binary image further including an area recognition part formed of a combination of a plurality of marks to distinguish an individual landmark from others is obtained in operation (a), and
    area information of the mobile robot is further detected by using the mark of the position recognition part.

14. The method of claim 13, wherein the area information is an identifier given corresponding to a number and position of each of the marks forming the area recognition part distinguish the individual landmark from others.

* * * * *

UNITED STATES PATENT AND TRADEMARK OFFICE
CERTIFICATE OF CORRECTION

PATENT NO. : 8,368,759 B2  Page 1 of 1
APPLICATION NO. : 12/531187
DATED : February 5, 2013
INVENTOR(S) : Yoo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 776 days.

Signed and Sealed this

First Day of September, 2015

Michelle K. Lee
*Director of the United States Patent and Trademark Office*